(12) United States Patent
Inomata et al.

(10) Patent No.: US 9,201,171 B2
(45) Date of Patent: Dec. 1, 2015

(54) OPTICAL LAYERED BODY, POLARIZER, AND IMAGE DISPLAY DEVICE

(75) Inventors: Yuya Inomata, Tokyo (JP); Tomoyuki Horio, Tokyo (JP); Takeshi Nishizono, Tokyo (JP); Kana Yamamoto, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 366 days.

(21) Appl. No.: 13/814,042

(22) PCT Filed: Aug. 2, 2011

(86) PCT No.: PCT/JP2011/067669
§ 371 (c)(1),
(2), (4) Date: Apr. 12, 2013

(87) PCT Pub. No.: WO2012/018009
PCT Pub. Date: Feb. 9, 2012

(65) Prior Publication Data
US 2013/0201556 A1    Aug. 8, 2013

(30) Foreign Application Priority Data
Aug. 2, 2010   (JP) ................. 2010-173913

(51) Int. Cl.
G02B 1/10   (2015.01)
G02B 5/30   (2006.01)

(52) U.S. Cl.
CPC ....... *G02B 1/105* (2013.01); *G02B 5/30* (2013.01); *Y10T 428/24421* (2015.01); *Y10T 428/24983* (2015.01)

(58) Field of Classification Search
CPC .. G02B 1/105; G02B 5/30; Y10T 428/24421; Y10T 428/24983

USPC .................. 359/483.01; 428/217; 427/164
See application file for complete search history.

(56) References Cited

U.S. PATENT DOCUMENTS

| | | | |
|---|---|---|---|
| 2004/0091643 A1* | 5/2004 | Nair et al. | 428/1.33 |
| 2007/0042173 A1* | 2/2007 | Nagaoka et al. | 428/313.9 |
| 2009/0029145 A1* | 1/2009 | Thies et al. | 428/315.7 |

FOREIGN PATENT DOCUMENTS

| | | |
|---|---|---|
| CN | 101738650 A | 6/2010 |
| JP | 2000-127281 A | 5/2000 |

(Continued)

OTHER PUBLICATIONS

Agilent Technologies, "Nanoindentation, Scratch, and Elevated Temperature Testing of Cellulose and PMMA Films," Application Note, http://cp.literature.agilent.com/litweb/pdf/5990-5761 EN.pdf, Printed in USA, Apr. 16, 2010, Accessed Apr. 4, 2015.*

*Primary Examiner* — Frank Font
(74) *Attorney, Agent, or Firm* — Novak Druce Connolly Bove + Quigg LLP

(57) ABSTRACT

The present invention provides an optical layered body having excellent hardness, abrasion resistance, and flexibility. The present invention provides an optical layered body having a hard coat layer on one side of a triacetylcellulose substrate, wherein a Martens hardness (N1) of a surface of the hard coat layer, a Martens hardness (N2) of the center of the cross-section of the hard coat layer, and a Martens hardness (N3) of the center of the cross-section of the triacetylcellulose substrate have a relationship of N2>N1>N3 as determined by nanoindentation, and the hard coat layer has a pencil hardness of 4H or more as measured by a test in accordance with a pencil hardness test defined in JIS K5600-5-4 (1999) at a load of 4.9 N.

10 Claims, 2 Drawing Sheets

(56) References Cited

FOREIGN PATENT DOCUMENTS

| | | | |
|---|---|---|---|
| JP | 2003-147017 A | 5/2003 |
| JP | 2006-106427 A | 4/2006 |
| JP | 2010-120991 A | 6/2010 |
| JP | 2010-122325 A | 6/2010 |

* cited by examiner

OPTICAL LAYERED BODY, POLARIZER, AND IMAGE DISPLAY DEVICE

CROSS REFERENCE TO RELATED APPLICATIONS

This application is a National Phase filing under 35 U.S.C. §371 of PCT/JP2011/067669 filed on Aug. 2, 2011; and this application claims priority to Application No. 2010-173913 filed in Japan on Aug. 2, 2010; the entire contents of all are hereby incorporated by reference.

TECHNICAL FIELD

The present invention relates to an optical layered body, a polarizer, and an image display device.

BACKGROUND ART

Image display devices such as cathode-ray tube (CRT) display devices, liquid crystal displays (LCDs), plasma display panels (PDPs), electroluminescence displays (ELDs), field emission displays (FEDs), touch panels, electronic paper, and tablet PCs are required to be provided with abrasion resistance in order to prevent damage during handling.

In response to such request, a hard coat film having a hard coat (HC) layer on a substrate film, and a hard coat film provided with optical functions such as anti-reflection properties and anti-glare properties have been usually used to improve the abrasion resistance of the image display surfaces of these image display devices.

As an example of hard coat films having a hard coat layer on a substrate film, Patent Literature 1 discloses a hard coat film, wherein a hard coat layer formed using an ultraviolet-curable resin such as pentaerythritol triacrylate (PETA) as a binder component is provided on a substrate film.

However, in the case of a hard coat film provided with a hard coat layer formed using such an ultraviolet-curable resin, it has been difficult to impart sufficient hardness to the hard coat layer (for example, a pencil hardness of 4H or more as measured by a test in accordance with a pencil hardness test specified in JIS K5600-5-4 (1999) at a load of 4.9 N).

Further, hard coat films have been required to have higher performance these days, and there has been a demand for a hard coat film having higher hardness and better abrasion resistance.

Unfortunately, conventional hard coat films cannot fully respond to such a demand.

Patent Literature 2, for example, discloses a hard coat film provided with a hard coat layer containing spherical silica fine particles.

In the case of a hard coat film provided with a hard coat layer containing such spherical silica fine particles, it has been difficult to achieve a hardness of 4H in the pencil hardness test defined above. Further, because materials for forming a hard coat layer are not crosslinkable, a large amount of light must be irradiated during light curing in order to impart high hardness to the hard coat layer, as described in Examples. When a substrate such as a triacetylcellulose film that is susceptible to heat damage is used as a substrate for forming a hard coat layer, it unfortunately results in the formation of visually apparent wrinkles due to heat damage on the substrate caused by polymerization heat during polymerization of the materials for forming the hard coat layer.

CITATION LIST

Patent Literature

Patent Literature 1: JP-A 2003-147017
Patent Literature 2: JP-A 2006-106427

SUMMARY OF INVENTION

Technical Problem

In view of the above-described situation, the present invention aims to provide an optical layered body having excellent hardness and abrasion resistance, and a polarizer and an image display device manufactured using the optical layered body.

SOLUTION TO PROBLEM

Figure 1:
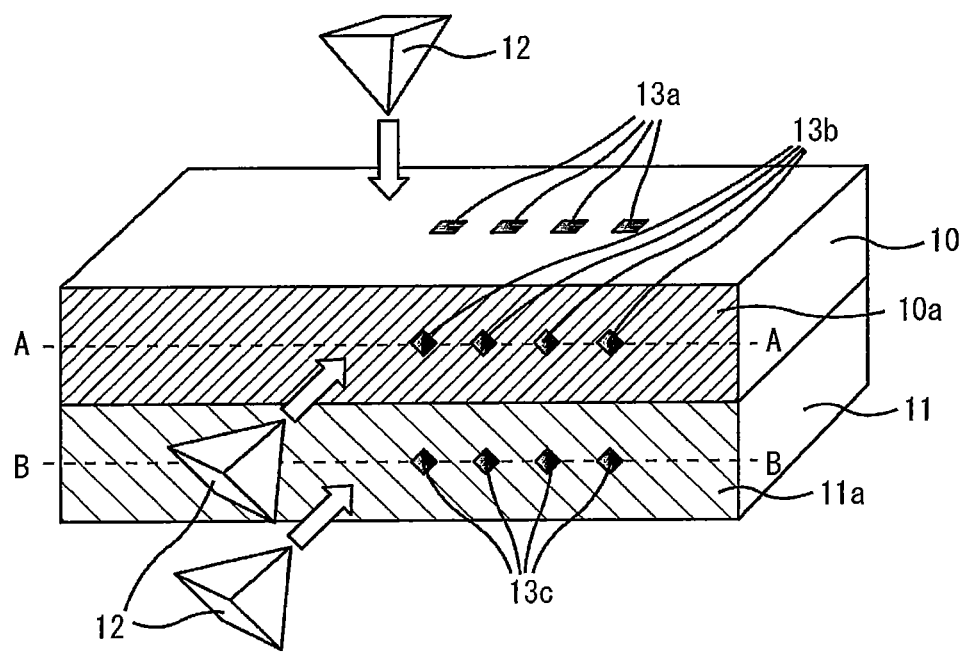
FIG. 1 is an isometric view illustrating how the Martens harnesses (N1, N2 and N3) are determined.
Figure 2:
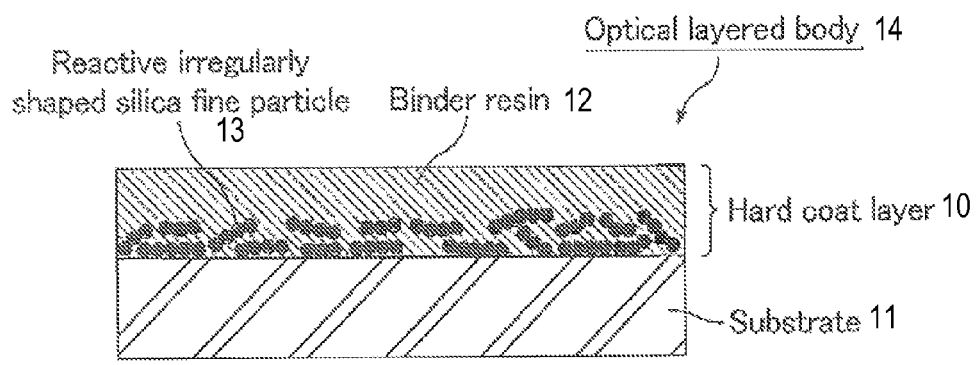
FIG. 2 is a schematic diagram of an optical layered body 14 according to the present invention wherein numeral 10 denotes the hard coat layer comprising binder resin 12 and reactive irregularly shaped silica fine particles 13, and numeral 11 denotes the substrate.
Figure 3:
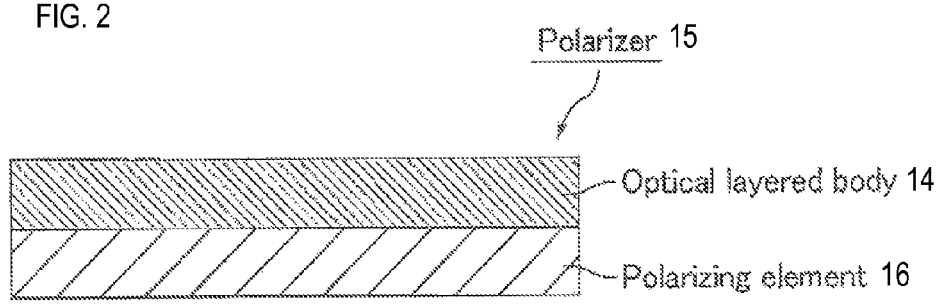
FIG. 3 is a schematic diagram of polarizer 15 according to the present invention wherein numeral 14 denotes an optical layered body 14 and numeral 16 denotes a polarizing element.
Figure 4:
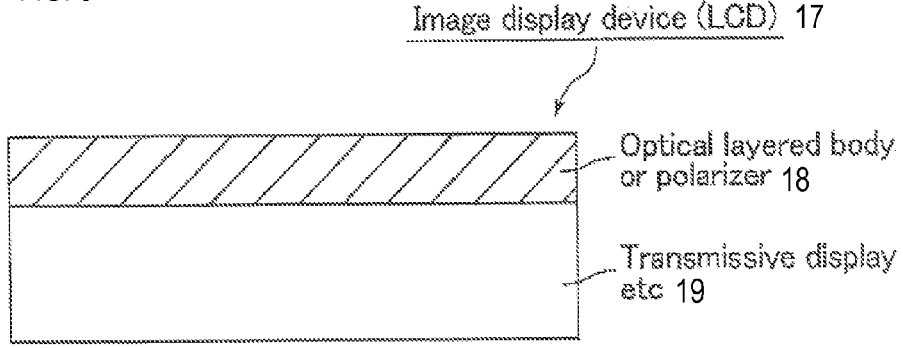
FIG. 4 is a schematic diagram of an image display device (LCD) 17 according to the present invention wherein numeral 18 denotes and optical layered body or polarizer and numeral 19 denotes a transmissive display.

The present invention provides an optical layered body having a hard coat layer formed on one side of a triacetylcellulose substrate, wherein a Martens hardness (N1) of a surface of the hard coat layer, a Martens hardness (N2) of the center of the cross-section of the hard coat layer, and a Martens hardness (N3) of the center of the cross-section of the triacetylcellulose substrate have a relationship of N2>N1>N3 as determined by nanoindentation, and the hard coat layer has a pencil hardness of 4H or more as measured by a test in accordance with a pencil hardness test specified in JIS K5600-5-4 (1999) at a load of 4.9 N.

In the optical layered body of the present invention, the Martens hardness (N3) of the center of the cross-section of the triacetylcellulose substrate after the hard coat layer is formed is preferably higher than a Martens hardness (N3b) of the center of the cross-section of the triacetylcellulose substrate before the hard coat layer is formed.

The hard coat layer preferably contains reactive irregularly shaped silica fine particles each including 3 to 20 spherical silica fine particles having an average primary particle size of 1 to 50 nm, the spherical silica fine particles being bonded to each other by an inorganic chemical bond.

The reactive irregularly shaped silica fine particles in the hard coat layer are preferably present in a greater amount on the triacetylcellulose substrate side of the hard coat layer.

An amount of the reactive irregularly shaped silica fine particle is preferably 10 to 70 parts by mass based on 100 parts by mass of binder resin in the hard coat layer.

The present invention also provides a polarizer including a polarizing element, wherein the polarizer includes the above-described optical layered body on a surface of the polarizing element.

The present invention also provides an image display device including the above-described optical layered body or the above-described polarizer on an outermost surface thereof.

The present invention is described in detail below.

The present invention is an optical layered body having a hard coat layer on one side of a triacetylcellulose substrate.

The above triacetylcellulose substrate has high transparency, excellent optical properties with small optical anisotropy due to low birefringence ratio, and excellent mechanical strength for use in a display.

The triacetylcellulose substrate preferably has a thickness of 20 to 300 µm, more preferably 30 to 200 µm. With a decrease in the weight of recent displays, the most preferable thickness is 30 to 65 µm.

In forming the hard coat layer on the triacetylcellulose substrate, the triacetylcellulose substrate may be previously subjected to physical treatment such as corona discharge treatment and oxidation treatment as well as application of an anchoring agent or a coating material called primer, in order to improve adhesion.

Further, in the optical layered body of the present invention, the triacetylcellulose substrate is preferably formed such that the Martens hardness (N3) of the center of the cross-section after the hard coat layer is formed is higher than a Martens hardness (N3$b$) (described later) of the center of the cross-section of the triacetylcellulose substrate before the hard coat layer is formed. Owing to such a triacetylcellulose substrate, the optical layered body has excellent hardness and abrasion resistance.

Herein, because the triacetylcellulose has excellent optical properties as described above, it is preferably used, for example, as a polarizer film. However, due to the physical properties of this cellulose material, the triacetylcellulose substrate by itself cannot provide sufficient hardness or abrasion resistance for use in display surfaces. Specifically, the triacetylcellulose substrate is weak and does not even have a pencil hardness of B at a load of 4.9 N. Thus, even when a hard coat layer having high hardness and abrasion resistance is laminated on the triacetylcellulose substrate, it has been impossible for the hard coat layer to fully exhibit its physical properties as long as the triacetylcellulose substrate is weak. For example, it is known that when a material of a substrate on which the above hard coat layer is laminated is changed to a material such as glass that allows the substrate to have sufficient hardness by itself, it results in an optical layered body having highly excellent hardness. Accordingly, in the present invention, studies were focused on the improvement of the hardness of the triacetylcellulose substrate itself, and it was found that high hardness can be achieved by the above-described relationship. The present invention is particularly preferable because even a thin triacetylcellulose substrate having a thickness of 30 to 65 µm can be favorably provided with high hardness.

Examples of methods for forming the triacetylcellulose substrate such that the Martens hardness (N3) of the center of the cross-section after the hard coat layer is formed is higher than the Martens hardness (N3$b$) of the center of the cross-section before the hard coat layer is formed include a method of forming a hard coat layer on the triacetylcellulose substrate using a hard coat layer-forming composition containing a penetrating solvent (described later). In this method, the hard coat layer-forming composition (described later) penetrates the triacetylcellulose substrate, creating a situation as if a hard coat layer was formed inside the triacetylcellulose substrate. Additionally, when forming a hard coat layer, the triacetylcellulose substrate is heated during a drying process and is also irradiated with ultraviolet light. These are assumed to be factors that contribute to the establishment of the above-described Martens hardness relationship at the center of the cross-section of the triacetylcellulose substrate.

The Martens hardness refers to a value measured by nanoindentation using Picodentor HM-500 produced by Fischer Instruments K.K.

When a load of 20 mN is applied to the optical layered body of the present invention, the Martens hardness of the center of the cross-section of the triacetylcellulose substrate is preferably 200 to 350 N/mm$^2$, more preferably 300 N/mm$^2$ or more. With a Martens hardness of 300 N/mm$^2$ or more, the triacetylcellulose substrate has high hardness, and thus a pencil hardness of 4H or more can be stably achieved.

With the hardness of the center of the cross-section of the triacetylcellulose substrate in the above range, the optical layered body of the present invention can be suitably provided with excellent hardness.

The optical layered body of the present invention includes a hard coat layer.

The optical layered body of the present invention is formed such that the Martens hardness (N1) of the surface of the hard coat layer, the Martens hardness (N2) of the center of the cross-section of the hard coat layer, and the Martens hardness (N3) of the center of the cross-section of the triacetylcellulose substrate have a relationship of N2>N1>N3 as determined by nanoindentation. Because of such a hardness relationship, the hardness and the abrasion resistance of the optical layered body of the present invention can be made particularly excellent.

The above-described Martens hardness relationship can be satisfied with, for example, a greater amount of reactive irregularly shaped silica fine particles (described later) being present on the triacetylcellulose side of the hard coat layer.

The hard coat layer preferably contains reactive irregularly shaped silica fine particles each including 3 to 20 spherical silica fine particles having an average primary particle size of 1 to 50 nm, the spherical silica fine particles being bonded to each other by an inorganic chemical bond.

The reactive irregularly shaped silica fine particles have a large surface area compared to spherical silica fine particles and the like having a similar particle size to that of the reactive irregularly shaped silica fine particles, and thus have excellent adhesion to a binder component (described later) that constitutes the hard coat layer. As a result, the optical layered body of the present invention is provided with the hard coat layer having excellent hardness and excellent abrasion resistance.

The reactive irregularly shaped silica fine particles preferably have a reactive functional group on the surface of the spherical silica fine particles constituting the reactive irregularly shaped silica fine particles.

The reactive functional group may be a functional group having reactivity to a binder component (described later) constituting the hard coat layer. Examples thereof include functional groups having an ethylenically unsaturated bond, such as (meth)acryloyl, vinyl, and allyl groups, and epoxy groups.

The spherical silica fine particles have an average primary particle size of 1 to 50 nm. With an average primary particle size of less than 1 nm, sufficient hardness cannot be imparted to the optical layered body of the present invention, resulting in poor abrasion resistance. With an average primary particle size of more than 50 nm, the particle size of the reactive irregularly shaped silica fine particles becomes too large, causing a reduction in the transparency of the hard coat layer, a decrease in the total light transmission of the optical layered body of the present invention, and an increase in the haze. A more preferred lower limit of the average primary particle size of the spherical silica fine particles is 5 nm, and more preferred upper limit is 40 nm. The spherical silica fine particles having an average primary particle size in the above range results in a more dense structure, thus achieving high hardness.

The average particle size of the spherical silica fine particles refers to 50% particle size (d50 median size) of a cumulative distribution of the particle size obtained by measuring the spherical silica fine particles in a solution by a dynamic light scattering method. The average particle size can be measured using a Microtrac particle analyzer or a Nanotrac particle analyzer produced by Nikkiso Co., Ltd.

The average primary particle size of the spherical silica fine particles can also be determined as the average particle size of 100 spherical silica fine particles observed using SEM or TEM images.

The reactive irregularly shaped silica fine particle is preferably such that at least a portion of the surface of spherical silica fine particles constituting the reactive irregularly shaped silica fine particle is covered with an organic component, and that the above-described reactive functional group is introduced into the surface of the spherical silica fine particles by the organic component.

No particular limitation is imposed on the spherical silica fine particles. Any conventionally known spherical silica fine particles and commercial products can be used.

Examples of the commercially available spherical silica fine particles include MIBK-ST, MIBK-ST-MS, MIBK-ST-L, and MIBK-ST-ZL produced by Nissan Chemical Industries, Ltd.

The reactive irregularly shaped silica fine particle is preferably an agglomeration of 3 to 20 spherical silica fine particles bonded to each other by an inorganic chemical bond, wherein at least a portion of the surface of the agglomeration is covered with an organic component and the above-described reactive functional group is introduced into the surface of the spherical silica fine particles. An agglomeration of less than 3 spherical silica fine particles is substantially the same as a monodisperse particle, and thus the hardness and the abrasion resistance of the optical layered body of the present invention may not be sufficiently improved. An agglomeration of more than 20 spherical silica fine particles results in a reduction in the transparency of the hard coat layer, a decrease in the transmittance of the optical layered body of the present invention, and an increase in the haze. The reactive irregularly shaped silica fine particle is more preferably an agglomeration of 5 to 15 spherical silica fine particles bonded to each other by an inorganic chemical bond.

Examples of the inorganic chemical bonds include ionic bond, metallic bond, coordinate bond, and covalent bond. Of these, bonds that prevent dispersion of the bonded fine particles even when the reactive irregularly shaped silica fine particles are added to a polar solvent are preferred. Specifically, metallic bond, coordinate bond, and covalent bond are preferred, and a covalent bond is more preferred. In the case where the reactive irregularly shaped silica fine particle is an agglomeration with no covalent bond, the agglomeration may be broken down by an external physical force when the hard coat layer is formed, and the shape of the agglomeration as the reactive irregularly shaped silica fine particle may not be maintained. Additionally, an external physical force (contact with a sharp object or the like) to the optical layered body of the present invention may disadvantageously break down and damage the agglomeration. In contrast, with a covalent bond, the agglomeration is unlikely to be broken down by a physical or chemical force and is thus stable.

The size of the reactive irregularly shaped silica fine particles, i.e., an average secondary particle size, is preferably 3 to 300 nm. In the above range, the optical layered body of the present invention can be provided with excellent hardness and abrasion resistance, without impairing the transparency of the hard coat layer. A more preferred limit of the average secondary particle size of the reactive irregularly shaped silica fine particles is 50 nm, and a more preferred upper limit is 250 nm.

The size of the reactive irregularly shaped silica fine particles (average secondary particle size) can be determined by the following manner: the cross section of the hard coat layer is observed using SEM or TEM images, 100 reactive irregularly shaped silica fine particles observed are counted, the circle equivalent diameter (Heywood diameter) of each reactive irregularly shaped silica fine particle is measured, and the average of circle equivalent diameters is determined as the average secondary particle size.

The amount of the reactive silica fine particles in the hard coat layer is preferably 10 to 70 parts by mass, based on 100 parts by mass of the binder resin (described below). With an amount of less than 10 parts by mass, it may not be possible to sufficiently increase the hardness of the hard coat layer. With an amount of more than 70 parts by mass, it may cause a reduction in the transparency of the hard coat layer or a decrease in the crack prevention properties thereof. A more preferred lower limit of the amount of the reactive irregularly shaped silica fine particles is 20 parts by mass, and a more preferred upper limit is 60 parts by mass.

The reactive irregularly shaped silica fine particles in the hard coat layer are preferably present in a greater amount on the triacetylcellulose substrate side of the hard coat layer. The reactive irregularly shaped silica fine particles being contained in the hard coat layer in the manner described above leads to the improvement of the Martens hardness of the coating film on the substrate side, thus resulting in the improvement of the pencil hardness.

The reactive irregularly shaped silica fine particles being present in a greater amount on the triacetylcellulose substrate side of the hard coat layer refers to a situation where there are more particles on the substrate side than on the side opposite the substrate (the side closer to the air) in the coat layer, when the hard coat film is observed in a cross section in the thickness direction.

The state of the reactive irregularly shaped silica fine particles being contained in the hard coat layer as described above can be confirmed by microscopic observation of the cross section of the hard coat layer.

A method for arranging a greater amount of reactive irregularly shaped silica fine particles on the triacetylcellulose substrate side of the hard coat layer is described later.

The hard coat layer contains a binder resin.

The binder resin is preferably a transparent binder resin. Examples thereof include ionizing radiation-curable resins, which are cured by ultraviolet light or electron beam; mixtures of the ionizing radiation-curable resins and solvent drying-type resins (i.e., resins, such as thermoplastic resins, which can be formed into a coating film simply by drying a solvent that was added thereto to adjust the solids content during coating); and thermosetting resins. Ionizing radiation-curable resins are more preferred. As used herein, the term "resin" is a concept that includes resin components such as monomers and oligomers.

Examples of the ionizing radiation-curable resins include compounds having one or two or more unsaturated bonds, such as a compound having an acrylate-based functional group. Examples of compounds having one unsaturated bond include ethyl(meth)acrylate, ethylhexyl(meth)acrylate, hexanediol(meth)acrylate, styrene, methylstyrene, and N-vinylpyrrolidone. Examples of compounds having two or more unsaturated bonds include polyfunctional compounds such as polymethylolpropane tri(meth)acrylate, tripropylene glycol di(meth)acrylate, diethylene glycol di(meth)acrylate, pentaerythritol tri(meth)acrylate, dipentaerythritol hexa(meth) acrylate, 1,6-hexanediol di(meth)acrylate, neopentylglycol di(meth)acrylate, trimethylolpropane triacrylate (TMPTA), dipentaerythritol pentaacrylate (DPPA), dipentaerythritol hexaacrylate (DPHA), and caprolactone modified dipentaerythritol hexaacrylate; and reaction products of these polyfunctional compounds with (meth)acrylate and the like (for example, poly(meth)acrylate esters of polyols). Preferred among the above are those having a weight average molecular weight of 200 or more to 800 or less (for example, pentaerythritol triacrylate (PETA), dipentaerythritol hexaacrylate (DPHA), trimethylolpropane triacrylate (TMPTA), dipentaerythritol pentaacrylate (DPPA), caprolactone modified dipentaerythritol hexaacrylate, and other modified products). Those having a weight average molecular weight of 600 or less (for example, pentaerythritol triacrylate (PETA) and its modified product) are particularly preferred. With the use of an ionizing radiation-curable resin having such a weight average molecular weight, the effect of the use of a penetrating solvent (described later) can be suitably achieved. The weight average molecular weight can be measured against a polystyrene standard by gel permeation chromatography (GPC).

As used herein, the term "(meth)acrylate" includes both acrylate and methacrylate.

In addition to the above compounds, relatively low-molecular weight resins having an unsaturated double bond, polyester resins, polyether resins, acrylic resins, epoxy resins, urethane resins, alkyd resins, spiroacetal resins, polybutadiene resins, and polythiol-polyene resins can also be used as the above ionizing radiation-curable resins.

The above ionizing radiation-curable resin can also be used in combination with a solvent drying-type resin. The use of the ionizing radiation-curable resin in combination with a solvent drying-type resin effectively prevents coating defects on a coated surface. No particular limitation is imposed on the solvent drying-type resin used in combination with the ionizing radiation-curable resin. Usually, a thermoplastic resin can be used.

No particular limitation is imposed on the thermoplastic resin. Examples thereof include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, and rubbers or elastomers. The above thermoplastic resin is preferably amorphous and soluble inorganic solvents (particularly, common solvents in which multiple polymers and curable compounds can be dissolved). In particular, from the viewpoint of film-forming properties, transparency, and weather resistance, resins such as styrene resins, (meth)acrylic resins, alicyclic olefin resins, polyester resins, and cellulose derivatives (cellulose esters and the like) are preferred.

Examples of thermosetting resins that can be used as the binder resin include phenolic resins, urea resins, diallyl phthalate resins, melamine resins, guanamine resins, unsaturated polyester resins, polyurethane resins, epoxy resins, amino alkyd resins, melamine-urea co-condensed resins, silicon resins, and polysiloxane resins.

The hard coat layer can be formed by applying the hard coat layer-forming composition containing the above-described reactive irregularly shaped silica fine particles, the binder resin, and the solvent to a triacetylcellulose substrate, and curing the formed coating film.

A solvent usable as the above-described solvent is selected depending on the type and the solubility of binder resins to be used. Examples include ketones (such as acetone, methyl ethyl ketone, methyl isobutyl ketone, and cyclohexanone), ethers (such as dioxane and tetrahydrofuran), aliphatic hydrocarbons (such as hexane), alicyclic hydrocarbons (such as cyclohexane), aromatic hydrocarbons (such as toluene and xylene), halocarbons (such as dichloromethane and dichloroethane), esters (such as methyl acetate, ethyl acetate, and butyl acetate), alcohols (such as ethanol, isopropanol, butanol, and cyclohexanol), cellosolves (such as methyl cellosolve and ethyl cellosolve), cellosolve acetates, sulfoxides (such as dimethyl sulfoxide), and amides (such as dimethylformamide and dimethylacetamide). Mixed solvents of these solvents may also be used.

It is particularly preferred that the above solvent contain a penetrating solvent that has an ability to penetrate the triacetylcellulose substrate. In the present invention, the meaning of the "ability to penetrate" of the penetrating solvent includes all the concepts such as ability to penetrate, swell, and wet the triacetylcellulose substrate.

Such a penetrating solvent swells or wets the triacetylcellulose substrate, and this allows a portion of the hard coat layer-forming composition to penetrate the triacetylcellulose substrate. The use of a penetrating solvent in the hard coat layer-forming composition enables the hardness of the center of the cross-section of the triacetylcellulose substrate to be even higher after the hard coat layer is formed. In particular, because the hard coat layer-forming composition contains an ionizing radiation-curable resin having a weight average molecular weight of 200 or more to 800 or less and having 3 or more reactive groups, a portion of the ionizing radiation-curable resin penetrates the triacetylcellulose substrate and is cured by crosslinking inside the triacetylcellulose substrate, resulting in an increase in the hardness. Examples of such ionizing radiation-curable resins include pentaerythritol triacrylate (PETA), trimethylolpropane triacrylate (TMPTA), dipentaerythritol pentaacrylate (DPPA), dipentaerythritol hexaacrylate (DPHA), and caprolactone modified dipentaerythritol hexaacrylate.

Specific examples of the penetrating solvent include ketones such as acetone, methyl ethyl ketone, cyclohexanone, methyl isobutyl ketone, diacetone alcohol; esters such as methyl formate, methyl acetate, ethyl acetate, butyl acetate, and ethyl lactate; nitrogen-containing compounds such as nitromethane, acetonitrile, N-methylpyrrolidone, and N,N-dimethylformamide; glycols such as methylglycol and methylglycol acetate; ethers such as tetrahydrofuran, 1,4-dioxane, dioxolan, and diisopropylether; halogenated hydrocarbons such as methylene chloride, chloroform, and tetrachloroethane; glycol ethers such as methyl cellosolve, ethyl cellosolve, butyl cellosolve, cellosolve acetate, PGME, and PGMEA; dimethyl sulfoxide; and propylene carbonate. Mixtures of these solvents are also included. Preferred among the above are esters and ketones, such as methyl acetate, ethyl acetate, butyl acetate, and methyl ethyl ketone. In addition, alcohols such as methanol, ethanol, isopropyl alcohol, butanol, and isobutyl alcohol; and aromatic hydrocarbons such as toluene and xylene can also be used by being mixed with the penetrating solvent.

Further, the amount of the penetrating solvent in the hard coat layer-forming composition is preferably 10 to 100% by mass, particularly 50 to 100% by mass, based on the total solvent weight.

The percentage of raw materials (solids content) in the hard coat layer-forming composition is not particularly limited. The percentage is usually 5 to 70% by mass, with 25 to 60% by mass being particularly preferred.

According to the purposes such as increasing the hardness of the hard coat layer, suppressing curing shrinkage, controlling the refractive index, and providing anti-glare properties, the hard coat layer-forming composition may be mixed with conventionally known additives such as dispersants, surfactants, antistatic agents, silane coupling agents, viscosifiers, anti-coloring agents, colorants (pigments and dyes), defoamers, leveling agents, flame retardants, ultraviolet absorbers, tackifiers, polymerization inhibitors, antioxidants, surface modifiers, lubricants, antifoulant, and fine particles that provide anti-glare properties (such as diffusion fine particles, low refractive index fine particles, and high refractive index fine particles).

A method for preparing the hard coat layer-forming composition is not particularly limited as long as the components are uniformly mixed. For example, a known device such as a paint shaker, a bead mill, a kneader, or a mixer can be used.

Specifically, the process for forming the hard coat layer is carried out by forming a coating film by applying the hard coat layer-forming composition on the triacetylcellulose substrate and curing the obtained coating film.

A method for applying the hard coat layer-forming composition is not particularly limited. Examples include publicly known methods such as a spin coating method, a dipping method, a spraying method, a die coating method, a bar coating method, a roll coater method, a meniscus coater method, a flexo-printing method, a screen printing method, a bead coater method, and a gravure coating method.

Although curing of the coating film is not particularly limited, the hard coat layer is preferably formed by drying the coating film, if necessary, and curing the coating film by heating, irradiation of active energy rays, or the like.

The irradiation of active energy rays includes, for example, irradiation of ultraviolet light or electron beam. Specific examples of sources of ultraviolet light include light sources such as super-high pressure mercury vapor lamp, high pressure mercury vapor lamp, low pressure mercury vapor lamp, carbon arc lamp, black light fluorescent lamp, and metal halide lamp. An ultraviolet light having a wavelength of 190 to 380 nm can be used. Specific examples of electron beam sources include electron beam accelerators of various types such as Cockcroft-Walton type, Van de Graaff type, resonance transformation type, insulation core transformer type, linear type, dynamitron type, and high-frequency type.

Herein, a hard coat layer in which a greater amount of reactive irregularly shaped silica fine particles are present on the triacetylcellulose substrate side of the hard coat layer can be formed, for example, using a hard coat layer-forming composition containing the penetrating solvent, a monomer of the binder resin, and the reactive irregularly shaped silica fine particles.

Specifically, the use of a hard coat layer-forming composition having the above composition causes monomers of the coating film formed on the triacetylcellulose substrate, specifically, monomers near the triacetylcellulose substrate, to penetrate the triacetylcellulose substrate along with the penetrating solvent. As a result, the coating film has more reactive irregularly shaped silica fine particles on the triacetylcellulose substrate side. Subsequently, the monomers in the coating film are cured, thereby forming a hard coat layer having a relatively greater amount of reactive irregularly shaped silica fine particles near the triacetylcellulose substrate.

As a hard coat layer is formed to have a relatively greater amount of reactive irregularly shaped silica fine particles near the triacetylcellulose substrate, it allows, owing to the high hardness of the reactive irregularly shaped silica fine particles, for the above-described Martens hardness (N1) of the surface of the hard coat layer, the above-described Martens hardness (N2) of the center of the cross-section of the hard coat layer, and the above-described Martens hardness (N3) of the center of the cross-section of the triacetylcellulose substrate to be easily brought into a relationship of N2>N1>N3, when determined by nanoindentation.

More specifically, the monomer component in the binder resin in the hard coat layer is caused to penetrate the triacetylcellulose substrate and be cured therein. This makes it possible to increase the hardness of the triacetylcellulose substrate. Because the hard coat layer laminated on the triacetylcellulose substrate has the relationship of N2>N1, the weakness of the triacetylcellulose substrate is further compensated. Additionally, because of the relationship of N1>N3, the surface of the optical layered body of the present invention is ultimately such that as if the hard coat layer was provided on a high hardness substrate like glass. As a result, the optical layered body of the present invention is provided with excellent hardness.

The optical layered body of the present invention is configured such that one hard coat layer is laminated on the triacetylcellulose substrate. However, because the relationship between the triacetylcellulose substrate and the hard coat layer in terms of Martens hardness is as described above, the resulting optical layered body is as if it was provided with a three-layered structure (quasi-three-layered structure) consisting of a triacetylcellulose substrate, a layer of reactive irregularly shaped silica fine particles, and a hard coat layer. In contrast, for example, if a hard coat layer homogeneously consisting of reactive irregularly shaped silica fine particles was formed on the triacetylcellulose substrate, a hard coat layer having high hardness would be directly present on the triacetylcellulose substrate. When the difference in hardness between the hard coat layer and the triacetylcellulose substrate is large, it can cause cracking, and the optical layered body curls up easily and has no strength against bending. On the other hand, in the case of the quasi-three-layered structure as in the present invention, there is no problem in adhesion because the structure actually has two layers, and the physical properties gradually change from the triacetylcellulose substrate to the outermost surface of the hard coat layer until the ultimate hardness is attained. The optical layered body can also be provided with excellent properties against cracking, curing, and bending.

A specific method for measuring the Martens hardness (N1) of the surface of the hard coat layer is as follows: for example, as shown in FIG. 1, a Vickers indenter 12, which is a square-based diamond pyramid with an angle of 136 degrees between the opposite faces, is pressed in a vertical direction into the surface of a hard coat layer 10 (the surface opposite the triacetylcellulose substrate), and the Martens hardness is determined from the resulting load-displacement curve. The Martens hardness is determined at five points, and the average is regarded as the Martens hardness (N1) of the surface of the hard coat layer. More specifically, the Martens hardness is determined as follows: the surface area A (mm$^2$) of a diamond-shaped depression 13a formed by pressing of the Vickers indenter is calculated from the diagonals of the depression, and a test load F (N) is divided by the surface area (F/A).

Further, the Martens hardness (N2) (the average of measurements at five points) of the center of the cross-section of the hard coat layer is determined in the same manner as in the N1 from depressions 13b formed by pressing the Vickers indenter 12 into the center (line A-A) on a cross-sectional surface 10a of the hard coat layer 10 in a vertical direction relative to the cross-sectional surface 10a. The Martens hardness (N3) (the average of measurements at five points) of the center of the cross-section of the triacetylcellulose substrate is determined in the same manner as in the N1 from depressions 13c formed by pressing the Vickers indenter 12 into the center (line B-B) on a cross-sectional surface 11a of a triacetylcellulose substrate 11 in a vertical direction relative to the cross-sectional surface 11a. These Martens hardness values can be measured using, for example, Picodentor HM-500 produced by Fischer Instruments K.K.

In the optical layered body of the present invention, in the case where the applied load is 20 mN, the Martens hardness (N1) of the surface of the hard coat layer is preferably 300 to 500 N/mm$^2$, more preferably 350 to 450 N/mm$^2$, and the Martens hardness (N2) of the center of the cross-section is preferably 350 to 550 N/mm$^2$, more preferably 400 to 500 N/mm$^2$.

Because the Martens hardness of the surface of the hard coat layer and the Martens hardness of the center of the cross-section of the hard coat layer are in the above ranges, the optical layered body of the present invention is suitably provided with excellent hardness.

Even when specific values of the Martens hardness (N1 and N2) are in the above ranges, N2 must be greater than N1. The reason is because if the value of N1 was greater than the value of N2, although it would improve the abrasion resistance of the hard coat layer, cracking would occur on the surface of the hard coat layer during a pencil hardness test, making it impossible to achieve a hardness of 4H or more. While the abrasion resistance reflects the hardness of only the outermost surface of the hard coat layer, the result of the pencil hardness test reflects the hardness relationship of the entire hard coat layer because a force is applied in the thickness direction of the hard coat layer. If the Martens hardness N1 was higher than the Martens hardness N2, it would result in brittleness because the hard coat layer is hard. On the other hand, with the relationship of N2>N1, it is possible for the N2 portion to support the high hardness N1 portion, as if the N2 portion were a glass substrate, and thus the brittleness can be compensated. If N1 was greater than N2 (N1>N2), no portion of the hard coat layer would be able to compensate the brittleness of the N1 portion, and thus cracking would occur easily.

The hard coat layer in the optical layered body of the present invention contains the reactive irregularly shaped silica fine particles, and thus has excellent hardness. Specifically, the hard coat layer in the optical layered body of the present invention exhibits a surface hardness of 4H or more in a pencil hardness test (at a load of 4.9 N) specified in JIS K5600-5-4 (1999).

As used herein, the hardness of the hard coat layer as measured by a pencil hardness test indicates the result evaluated based on the following criteria: out of five scratch tests, when the scratch leaves a mark having a length equal to or longer than ⅓ of the distance of the scratch, the result is regarded as unsatisfactory, and a hard coat layer with one or no unsatisfactory results is regarded as having passed the pencil hardness test. Specifically, in the case where a hard coat layer has one such scratch mark from five scratch tests, the result is expressed as ⅘ and considered as passing.

Specific examples of methods for providing a pencil hardness of 4H or more to the hard coat layer preferably include a method in which reactive irregularly shaped silica fine particles are incorporated in the hard coat layer-forming composition, and a method in which a reactive polymer or oligomer having 6 to 15 functional groups and the reactive irregularly shaped silica fine particles are incorporated in the hard coat-forming composition. A preferable example of reactive groups of the reactive polymer or oligomer is a (meth)acryloyl group of ionizing radiation-curable type. A preferable example of the reactive polymers or oligomers having 6 to 15 functional groups is a urethane acrylate oligomer having 6 to 15 functional groups. Specific examples include a UV1700B (10 functional groups) produced by the Nippon Synthetic Chemical Industry Co., Ltd.

Further, the optical layered body of the present invention preferably has a total light transmission of 85% or more. A total light transmission of less than 85% may result in poor color reproducibility, visibility, and contrast in the case where the optical layered body of the present invention is mounted on the surface of an image display device. The total light transmission is preferably 90% or more, and more preferably 92% or more.

The optical layered body of the present invention preferably has a haze of less than 1%, more preferably less than 0.50.

The optical layered body of the present invention may be suitably formed with one or two or more other layers (such as an anti-glare layer, an antistatic layer, a low refractive index layer, an antifouling layer, an adhesive layer, and another hard coat layer) if necessary, as long as the effects of the present invention are not impaired. In particular, it is preferred that at least one layer from an anti-glare layer, an antistatic layer, a low refractive index layer, and an antifouling layer be provided to the optical layered body. These layers may be the same as those used for known antireflection layered bodies.

The optical layered body of the present invention can be manufactured by forming a hard coat layer on a triacetylcellulose substrate using a hard coat layer-forming composition containing reactive irregularly shaped silica fine particles, a binder resin, and a solvent.

The hard coat layer-forming composition and the hard coat layer may be formed using the same materials by the same methods as described for the above hard coat layer.

The optical layered body of the present invention can be formed into a polarizer by arranging the optical layered body of the present invention on the surface of a polarizing element, on the side opposite where the hard coat layer is present. Such a polarizer is also an aspect of the present invention.

The polarizing element is not particularly limited. For example, polyvinyl alcohol film, polyvinyl formal film, polyvinyl acetal film, ethylene-vinyl acetate copolymer-based saponified film, or the like which have been dyed with iodine or the like and stretched can be used. In lamination of the polarizing element and the optical layered body of the present invention, the light transmissive substrate (triacetylcellulose film) is preferably saponified. A good adhesion and an antistatic effect can be obtained by saponification treatment.

Another aspect of the present invention is an image display device including the optical layered body or the polarizer on the outermost surface thereof.

The image display device may be, for example, an LCD, a PDP, an FED, an ELD (organic EL or inorganic EL), a CRT, a touch panel, an electronic paper, or a tablet PC.

The LCD, which is a typical example, includes a transmissive display and a light source device that irradiates the transmissive display from behind. When the image display device of the present invention is an LCD, the optical layered body of the present invention or the polarizer of the present invention is formed on the surface of the transmissive display.

When the present invention is a liquid crystal display device having the optical layered body, the optical layered body is irradiated from below with a light source of the light source device. In the case of an STN, VA, or IPS liquid crystal display device, a retarder may be inserted between the liquid crystal display element and the polarizer. An adhesive layer may be provided, if necessary, between each layer of the liquid crystal display device.

The PDP as the image display device includes a front glass substrate (in which electrodes are formed on the surface) and a rear glass substrate (in which electrodes and microscopic grooves are formed on the surface, and red, green, and blue phosphor layers are formed in the grooves) disposed to face the front glass substrate, with a discharge gas enclosed between these substrates. When the image display device of the present invention is a PDP, the PDP includes the optical layered body disposed on the surface of the front glass substrate or a front plate (a glass substrate or a film substrate) thereof.

The image display device may be, for example, an ELD apparatus in which phosphors such as zinc sulfide or diamines, which emit light when a voltage is applied thereto, are deposited on a glass substrate, and the voltage to be applied to the substrate is controlled to perform display; or a CRT that converts electrical signals into light and produces images visible to human eyes. In this case, each image display device includes the above-described optical layered body on the outermost surface of such a display device as described above, or on the surface of a front plate of the display device.

In any of the cases, the image display device of the present invention can be used for displays such as televisions and computers. In particular, the image display device can be suitably used in the surface of displays for high-definition images, such as CRTs, liquid crystal panels, PDPs, ELDs, FEDs, touch panels, electronic paper, and tablet PCs.

ADVANTAGEOUS EFFECTS OF INVENTION

Because the optical layered body of the present invention is configured as described above, the hard coat layer has excellent hardness and abrasion resistance. Thus, the optical layered body of the present invention is suitably applicable to cathode-ray tube (CRT) display devices, liquid crystal displays (LCDs), plasma display panels (PDPs), (organic or inorganic) electroluminescence displays (ELDs), field emission displays (FEDs), touch panels, electronic paper, tablet PCs, and the like.

BRIEF DESCRIPTION OF DRAWINGS

FIG. 1 is a schematic diagram for describing a method for measuring the Martens hardness.

DESCRIPTION OF EMBODIMENTS

The present invention is described with reference to the following examples; however, interpretation of the present invention should not be limited to these examples. Additionally, "parts" and "%" are mass basis unless otherwise specified.

Hard coat layer-forming compositions 1 to 3 were prepared by the following formulation.
<Hard Coat Layer-Forming Composition 1>
Resin 1: dipentaerythritol hexaacrylate (produced by Nippon Kayaku Co., Ltd.; DPHA), 20 parts by mass
Reactive irregularly shaped silica fine particles (A-1), 20 parts by mass (solids content)
Resin 2: polymer acrylate (B-1), 10 parts by mass
Polymerization initiator 1: Irg. 184 (Produced by Chiba Japan Co., Ltd.; Irgacure 184), 2 parts by mass
Leveling agent 1: fluorinated surfactant (produced by DIC corporation; Megafac MCF 350-5), 0.05 parts by mass
Methyl isobutyl ketone (MIBK), 50 parts by mass The reactive irregularly shaped silica fine particles (A-1) have an average secondary particle size of 100 nm, in which each particle includes four spherical silica fine particles having an average primary particle size of 30 nm are bonded to each other by an inorganic chemical bond; and are diluted with MIBK to a solids content of 40%.

The polymer acrylate (B-1) has 10 or more acryloyl groups (10 or more functional groups) per molecule, and has a weight average molecular weight (Mw) of 15000.
<Hard Coat Layer-Forming Compositions 2 to 10>

Hard coat layer-forming compositions 2 to 10 were prepared based on the composition and the formulation shown in Table 1.

In Table 1,
"A-3" indicates monodisperse reactive silica fine particles (particle size of 15 nm, solids content of 30%, and diluted with MIBK), and
"A-4" indicates reactive irregularly shaped silica fine particles having an average secondary particle size of 80 nm, in which five spherical silica fine particles having an average primary particle size of 20 nm are bonded to each other by an inorganic chemical bond; and is diluted with MIBK to a solids content of 40%.
<Hard Coat Layer-Forming Composition 11>
Resin 1: pentaerythritol triacrylate; PETA (produced by Nippon Kayaku Co., Ltd.; PET30), 30 parts by mass
Resin 2: polymer acrylate (B-1), 20 parts by mass
Initiator 1: Irg. 184 (Produced by Chiba Japan Co., Ltd.; Irgacure 184), 1 part by mass
Initiator 2: Irg. 907 (Produced by Chiba Japan Co., Ltd.; Irgacure 907), 1 part by mass
Leveling agent 1: (produced by DIC corporation; Megafac MCF 350-5), 0.05 parts by mass
MIBK, 50 parts by mass
<Hard Coat Layer-Forming Composition 12>
Resin 1: pentaerythritol triacrylate; PETA (produced by Nippon Kayaku Co., Ltd.; PET30) 30 parts by mass
Resin 2: multi-functional urethane acrylate (produced by the Nippon Synthetic Chemical Industry Co., Ltd.; UV1700B, 10 functional groups), 20 parts by mass
Initiator 1: Irg. 184 (Produced by Chiba Japan Co., Ltd.; Irgacure 184), 2 parts by mass
Leveling agent 1: (produced by DIC corporation; Megafac MCF 350-5), 0.05 parts by mass
Methyl isobutyl ketone, 50 parts by mass
<Hard Coat Layer-Forming Compositions 13 to 21>

Hard coat layer-forming compositions 13 to 21 were prepared based on the composition and the formulation shown in Table 1.

In Table 1,
"A-2" indicates monodisperse silica fine particles (produced by Nissan Chemical Industries, Ltd.; MIBK-ST);
"A-5" indicates reactive irregularly shaped silica fine particles having an average secondary particle size of 500 nm, in which 30 spherical silica fine particles having an average primary particle size of 30 nm are bonded to each other by an inorganic chemical bond; and is diluted with MIBK to a solids content of 40%; and
"A-6" indicates reactive irregularly shaped silica fine particles having an average secondary particle size of 200 nm, in which 4 spherical silica fine particles having an average primary particle size of 60 nm are bonded to each other by an inorganic chemical bond; and is diluted with MIBK to a solids content of 40%.

With an applied load of 20 mN, the average of measurements at five points performed on the surface of the hard coat layer was regarded as N1 (N/mm$^2$).

TABLE 1

| | Silica fine particles | | Resin 1 | | Resin 2 | | Polymerization initiator | | Leveling agent | | Solvent | |
|---|---|---|---|---|---|---|---|---|---|---|---|---|
| | Type | Parts by mass | Type | Parts by mass | Type | Parts by mass | Type | Parts by mass | Type | Parts by mass | Type | Parts by mass |
| Hard coat layer-forming composition 1 | A-1 | 20 | DPHA | 20 | B-1 | 10 | Irg.184 | 2 | MCF350-5 | 0.05 | MIBK | 50 |
| Hard coat layer-forming composition 2 | A-1 | 10 | DPHA | 30 | B-1 | 10 | Irg.184 | 2 | MCF350-5 | 0.05 | MIBK | 50 |
| Hard coat layer-forming composition 3 | A-1 | 30 | DPHA | 10 | B-1 | 10 | Irg.184 | 2 | MCF350-5 | 0.05 | MIBK | 50 |
| Hard coat layer-forming composition 4 | A-1 | 20 | DPHA | 10 | UV1700B | 20 | Irg.184 | 2 | MCF350-5 | 0.05 | MIBK | 50 |
| Hard coat layer-forming composition 5 | A-3 | 20 | PETA | 10 | UV1700B | 20 | Irg.184 | 2 | MCF350-5 | 0.05 | MIBK | 50 |
| Hard coat layer-forming composition 6 | A-1 | 20 | PETA | 30 | — | — | Irg.184 | 2 | MCF350-5 | 0.05 | MIBK | 50 |
| Hard coat layer-forming composition 7 | A-4 | 20 | PETA | 20 | B-1 | 10 | Irg.907 | 2 | MCF350-5 | 0.05 | MIBK | 50 |
| Hard coat layer-forming composition 8 | A-1 | 15 | DPHA | 25 | B-1 | 10 | Irg.184 | 2 | MCF350-5 | 0.05 | MEK | 50 |
| Hard coat layer-forming composition 9 | A-1 | 15 | PETA | 25 | 1700B | 15 | Irg.184 | 4 | MCF350-5 | 0.05 | MEK | 50 |
| Hard coat layer-forming composition 10 | A-1 | 15 | PETA | 25 | 1700B | 15 | Irg.184 | 4 | MCF350-5 | 0.05 | Cyclo-hexanone | 50 |
| Hard coat layer-forming composition 11 | — | — | PETA | 30 | B-1 | 20 | Irg.184 / Irg.907 | 1 / 1 | MCF350-5 | 0.05 | MIBK | 50 |
| Hard coat layer-forming composition 12 | — | — | PETA | 30 | UV1700B | 20 | Irg.184 | 2 | MCF350-5 | 0.05 | MIBK | 50 |
| Hard coat layer-forming composition 13 | A-1 | 40 | DPHA | 10 | — | — | Irg.184 | 2 | MCF350-5 | 0.05 | MIBK | 50 |
| Hard coat layer-forming composition 14 | A-2 | 20 | PETA | 20 | B-1 | 10 | Irg.184 / Irg.907 | 1 / 1 | MCF350-5 | 0.05 | MIBK | 50 |
| Hard coat layer-forming composition 15 | A-5 | 20 | DPHA | 10 | B-1 | 20 | Irg.184 | 2 | MCF350-5 | 0.05 | MIBK | 50 |
| Hard coat layer-forming composition 16 | A-5 | 20 | DPHA | 10 | B-1 | 20 | Irg.184 | 2 | MCF350-5 | 0.05 | MEK | 50 |
| Hard coat layer-forming composition 17 | — | — | PETA | 50 | — | — | Irg.184 | 2 | MCF350-5 | 0.05 | Toluene | 50 |
| Hard coat layer-forming composition 18 | — | — | — | — | UV1700B | 50 | Irg.184 | 2 | MCF350-5 | 0.05 | MEK | 50 |
| Hard coat layer-forming composition 19 | A-6 | 20 | PETA | 10 | UV1700B | 20 | Irg.184 | 2 | MCF350-5 | 0.05 | MIBK | 50 |
| Hard coat layer-forming composition 20 | A-1 | 5 | PETA | 25 | UV1700B | 20 | Irg.184 | 2 | MCF350-5 | 0.05 | MIBK | 50 |
| Hard coat layer-forming composition 21 | — | — | — | — | B-1 | 50 | Irg.907 | 2 | MCF350-5 | 0.05 | MIBK | 50 |

Example 1

A triacetylcellulose substrate (thickness of 40 μm, produced by Konica Minolta Holdings, Inc.; KC4UYW) was provided, and a hard coat layer-forming composition 1 was applied to one side of the substrate. The thus-obtained coating film was dried in a thermal oven at 70° C. for 60 seconds to evaporate the solvent in the coating film, and irradiated with ultraviolet light to a cumulative amount of light of 100 mJ/cm$^2$ to cure the coating film. Thereby, a hard coat layer of 10 g/cm$^2$ (dry basis) was formed, and an optical layered body was prepared.

Examples 2 to 10, Comparative Examples 1 to 8, Reference Examples 1 to 3

Optical layered bodies of Examples 2 to 10, Comparative Examples 1 to 8, and Reference Examples 1 to 3 were prepared in the same manner as in Example 1, except that hard coat layer-forming compositions 2 to 21 were used as shown in Table 2 instead of the hard coat layer-forming composition 1.

The optical layered bodies obtained in Examples, Comparative Examples, and Reference Examples were evaluated by the following methods. Table 2 shows the results.
(Evaluation 1: Measurement of Martens Hardness)

The optical layered bodies of Examples, Comparative Examples, and Reference Examples were subjected to measurement of Martens hardness by nanoindentation using Picodentor HM-500 produced by Fischer Instruments K.K. The measurement was performed on the surface of each hard coat layer, the center of the cross-section thereof, and the center of the cross-section of each triacetylcellulose substrate.

Further, the optical layered bodies of Examples, Comparative Examples, and Reference Examples were cut into about 50-μm pieces. With an applied load of 20 mN, the average of measurements at five points performed on the substantially center of the cross-section of the hard coat layer was regarded as N2, and the average of measurements at five points performed on the substantially center of the cross-section of the triacetylcellulose substrate was regarded as N3.

Further, in the optical layered bodies of Examples, Comparative Examples, and Reference Examples, the Martens hardness of the center of the cross-section of the triacetylcellulose substrate was measured prior to the formation of the hard coat layer, and the average of five measurement was regarded as N3b. A specific measurement method of Martens hardness is as described above using FIG. 1.
(Evaluation 2: Pencil Hardness)

The optical layered bodies of Examples, Comparative Examples, and Reference Examples were conditioned at a temperature of 23° C. and a relative humidity of 50% for 16 hours or more. Subsequently, a scratch test was performed at a load of 4.9 N in accordance with a pencil hardness evaluation method specified in JIS K5600-5-4 (1999), using a test pencil (hardness 4H) specified in JIS S 6006. Results were evaluated based on the following criteria.

A scratch test was performed five times. When the scratch left a mark having a length equal to or longer than ⅓ of the distance of the scratch and when such a scratch mark was visible under sufficiently bright fluorescent light, the result was regarded as unsatisfactory. A hard coat layer with one or no unsatisfactory results out of five tests was regarded as having passed the pencil hardness test (good). A hard coat layer with two or more such scratch marks was regarded as having failed the pencil hardness test (poor).

(Evaluation 3: Abrasion Resistance)

The surface of the hard coat layer of each optical layered body of Examples, Comparative Examples, and Reference Examples was rubbed 10 times back and forth using #0000 steel wool at various friction loads. Subsequently, damage and peeling of the coating film were visually checked, and the results were evaluated based on the following criteria.

Excellent: neither damage nor peeling of the coating film occurred at a load of 1000 g/cm$^2$.

Poor: damage or peeling of the coating film occurred at a load of 1000 g/cm$^2$.

(Evaluation 4: Flexibility)

In accordance with a mandrel test (a test in which samples are wrapped around metal cylinders with a diameter of 2 mm to 32 mm) described in JIS K5600-5-1, each optical layered body of Examples, Comparative Examples, and Reference Examples was longitudinally wrapped around a cylinder in such a manner that the hard coat layer faces outside, and a minimum diameter of a cylinder with which cracking did not occur was recorded. Specifically, in the case where cracking occurred with a cylinder having a diameter of 15 mm and no cracking occurred with a cylinder having a diameter of 16 mm, 16 mm was recorded as a minimum diameter.

(Evaluation 5: Haze)

The haze value (%) of each optical layered body of Examples, Comparative Examples, and Reference Examples was measured using a haze meter (produced by Murakami Color Research Laboratory; product number HM-150), in accordance with JIS K-7136.

layered bodies of Examples. The optical layered body of Reference Example 2 had a poor result on the 4H pencil hardness test, and also had higher haze compared to the optical layered bodies of Examples.

INDUSTRIAL APPLICABILITY

The optical layered body of the present invention is suitably applicable to cathode-ray tube (CRT) display devices, liquid crystal displays (LCDs), plasma display panels (PDPs), electroluminescence displays (ELDs), field emission displays (FEDs), touch panels, electronic paper, tablet PCs, and the like.

REFERENCE SINGS LIST

10 hard coat layer
10a cross-section
11 triacetylcellulose substrate
11a cross-section
12 Vickers indenter
13a, 13b, 13c depressions

The invention claimed is:

1. An optical layered body comprising a hard coat layer formed on one side of a triacetylcellulose substrate,
   wherein a Martens hardness (N1) of a surface of the hard coat layer, a Martens hardness (N2) of the center of the cross-section of the hard coat layer, and a Martens hardness (N3) of the center of the cross-section of the triace-

TABLE 2

| | Hard coat layer-forming composition | N1 (N/mm$^2$) | N2 (N/mm$^2$) | N3 (N/mm$^2$) | N3b (N/mm$^2$) | Pencil hardness 4H | Abrasion resistance | Flexibility (mm) | Haze (%) |
|---|---|---|---|---|---|---|---|---|---|
| Example 1 | (1) | 417 | 455 | 313 | 169 | Good | Excellent | 16 | 0.4 |
| Example 2 | (2) | 400 | 435 | 310 | 170 | Good | Excellent | 17 | 0.3 |
| Example 3 | (3) | 438 | 482 | 320 | 172 | Good | Excellent | 17 | 0.4 |
| Example 4 | (4) | 407 | 449 | 303 | 173 | Good | Excellent | 16 | 0.4 |
| Example 5 | (5) | 398 | 423 | 301 | 171 | Good | Excellent | 16 | 0.4 |
| Example 6 | (6) | 420 | 460 | 322 | 172 | Good | Excellent | 19 | 0.4 |
| Example 7 | (7) | 415 | 453 | 312 | 169 | Good | Excellent | 17 | 0.4 |
| Example 8 | (8) | 403 | 432 | 307 | 173 | Good | Excellent | 17 | 0.4 |
| Example 9 | (9) | 401 | 441 | 329 | 170 | Good | Excellent | 16 | 0.4 |
| Example 10 | (10) | 402 | 446 | 312 | 171 | Good | Excellent | 16 | 0.4 |
| Comparative Example 1 | (11) | 230 | 229 | 293 | 172 | Poor | Good | 16 | 0.3 |
| Comparative Example 2 | (12) | 238 | 180 | 297 | 169 | Poor | Good | 16 | 0.3 |
| Comparative Example 3 | (13) | 460 | 458 | 208 | 173 | Poor | Excellent | 18 | 0.7 |
| Comparative Example 4 | (14) | 285 | 332 | 288 | 173 | Poor | Good | 17 | 0.4 |
| Comparative Example 5 | (17) | 251 | 244 | 185 | 175 | Poor | Good | 19 | 0.3 |
| Comparative Example 6 | (18) | 228 | 176 | 180 | 175 | Poor | Good | 15 | 0.3 |
| Comparative Example 7 | (20) | 290 | 286 | 298 | 179 | Poor | Good | 16 | 0.3 |
| Comparative Example 8 | (21) | 151 | 173 | 188 | 175 | Poor | Poor | 13 | 0.3 |
| Reference Example 1 | (15) | 448 | 470 | 316 | 172 | Good | Excellent | 16 | 0.6 |
| Reference Example 2 | (16) | 438 | 466 | 316 | 171 | Poor | Good | 16 | 0.6 |
| Reference Example 3 | (19) | 405 | 440 | 307 | 174 | Good | Excellent | 16 | 0.7 |

According to Table 2, the optical layered bodies of Examples 1 to 10 had good results on the 4H pencil hardness test and showed excellent abrasion resistance, although they were formed using a triacetylcellulose substrate having a thickness of 40 μm. Accordingly, the present invention is effective in reducing the weight of displays. In contrast, each optical layered body of Comparative Examples had a poor result on the 4H pencil hardness test. The optical layered body of Comparative Example 8 was also poor in abrasion resistance and in adhesion between the triacetylcellulose substrate and the hard coat layer. The optical layered bodies of Reference Examples 1 and 3 had good results on the 4H pencil hardness test, but had higher haze compared to the optical tylcellulose substrate have a relationship of N2>N1>N3 as determined by nanoindentation, and the hard coat layer has a pencil hardness of 4H or more as measured by a test in accordance with a pencil hardness test specified in JIS K5600-5-4 (1999) at a load of 4.9 N, wherein tests for the Martens hardness (N1), Martens hardness (N2), Martens hardness (N3) and pencil hardness are preformed after the hard coat layer is formed.

2. The optical layered body according to claim 1,
   wherein the Martens hardness (N3) of the center of the cross-section of the triacetylcellulose substrate after the hard coat layer is formed is higher than a Martens hardness (N3b) of the center of the cross-section of the triacetylcellulose substrate before the hard coat layer is formed.

3. The optical layered body according to claim 2, wherein the hard coat layer comprises reactive irregularly shaped silica fine particles each comprising 3 to 20 spherical silica fine particles having an average primary particle size of 1 to 50 nm, the spherical silica fine particles being bonded to each other by an inorganic chemical bond.

4. The optical layered body according to claim 1, wherein the hard coat layer comprises reactive irregularly shaped silica fine particles each comprising 3 to 20 spherical silica fine particles having an average primary particle size of 1 to 50 nm, the spherical silica fine particles being bonded to each other by an inorganic chemical bond.

5. The optical layered body according to claim 4, wherein the hard coat layer contains a greater amount of reactive irregularly shaped silica fine particles on the triacetylcellulose substrate side.

6. The optical layered body according to claim 5, wherein the reactive irregularly shaped silica fine particles are contained in an amount of 10 to 70 parts by mass based on 100 parts by mass of binder resin in the hard coat layer.

7. The optical layered body according to claim 4, wherein the reactive irregularly shaped silica fine particles are contained in an amount of 10 to 70 parts by mass based on 100 parts by mass of binder resin in the hard coat layer.

8. A polarizer comprising a polarizing element, wherein the polarizer comprises the optical layered body according to claim 1 on a surface of the polarizing element.

9. An image display device comprising an optical layered body comprising a hard coat layer formed on one side of a triacetylcellulose substrate,
wherein a Martens hardness (N1) of a surface of the hard coat layer, a Martens hardness (N2) of the center of the cross-section of the hard coat layer, and a Martens hardness (N3) of the center of the cross-section of the triacetylcellulose substrate have a relationship of N2>N1>N3 as determined by nanoindentation, and
the hard coat layer has a pencil hardness of 4H or more as measured by a test in accordance with a pencil hardness test specified in JIS K5600-5-4 (1999) at a load of 4.9 N or a polarizer comprising said optical layered body on an outermost surface thereof.

10. An image display device comprising the optical layered body according to claim 1 on an outermost surface thereof.

* * * * *